(12) United States Patent
Kakino et al.

(10) Patent No.: US 6,772,039 B2
(45) Date of Patent: Aug. 3, 2004

(54) NC PROGRAM GENERATING METHOD, NC PROGRAM GENERATING APPARATUS, COMPUTER MEMORY PRODUCT, AND COMPUTER PROGRAM PRODUCT

(75) Inventors: Yoshiaki Kakino, 256-5, Iwakura-Hanazono-cho, Sakyo-ku, Kyoto 606-0024 (JP); Heisaburo Nakagawa, 1700-A-303, Kaideima-cho, Hikone-shi, Shiga 522-0056 (JP); Hirotoshi Ohtsuka, Oita (JP); Masakazu Tabata, Chiba (JP); Hisashi Otsubo, Okayama (JP)

(73) Assignees: Yoshiaki Kakino, Kyoto (JP); Heisaburo Nakagawa, Shiga (JP); Graphic Products, Inc., Chiba (JP); Yasda Precision Tools K.K., Okayama (JP); Mori Seiki Co., Ltd., Nara (JP)

( * ) Notice: Subject to any disclaimer, the term of this patent is extended or adjusted under 35 U.S.C. 154(b) by 153 days.

(21) Appl. No.: 10/231,471

(22) Filed: Aug. 30, 2002

(65) Prior Publication Data

US 2003/0125829 A1 Jul. 3, 2003

(30) Foreign Application Priority Data

Dec. 4, 2001 (JP) ........................ 2001-370644

(51) Int. Cl.[7] ............................... G06F 19/00
(52) U.S. Cl. ................. 700/160; 700/86; 700/173; 700/188
(58) Field of Search ............ 700/160, 95, 164, 700/173–175, 177, 181, 182, 188, 86; 409/131, 132

(56) References Cited

U.S. PATENT DOCUMENTS

5,917,726 A * 6/1999 Pryor .......................... 700/95
6,506,004 B1 * 1/2003 Kohlhase et al. ........... 409/131

FOREIGN PATENT DOCUMENTS

WO    WO98/19822    5/1998

OTHER PUBLICATIONS

Kakino et al. "Intellignet Endmilling System and Its Application to Internal Cylindrical Machining with Sprial Curves" 2002 Japan–USA Symposium on Flexible Automation Hiroshima, Japan. pp. 415–420 Jul. 14–19, 2002.

* cited by examiner

*Primary Examiner*—Leo Picard
*Assistant Examiner*—Steven R. Garland
(74) *Attorney, Agent, or Firm*—Arent Fox PLLC

(57) ABSTRACT

A maximum undeformed chip thickness, a cutting arc length or an engage angle, and an active angle for each tooth of the end mill are calculated when a ball end mill is used in machining, or the maximum undeformed chip thickness, the cutting arc length or the engage angle, and an axial depth of cut for each tooth of the end mill are calculated when a straight end mill is used in machining. Then, the estimated value of the cutting force $F_{xy}$ or $F_{xyz}$ in each portion of the tool path is calculated on the basis of a response surface whose explanation variables are composed of the above-mentioned calculated values, whereby the feed rate contained in an equation for the maximum undeformed chip thickness $t_m$ is determined to maintain the obtained estimated value of the cutting force $F_{xy}$ or $F_{xyz}$ at an appropriate value.

4 Claims, 15 Drawing Sheets

NC PROGRAM GENERATING METHOD, NC PROGRAM GENERATING APPARATUS, COMPUTER MEMORY PRODUCT, AND COMPUTER PROGRAM PRODUCT

BACKGROUND OF THE INVENTION

1. Field of the Invention

The present invention relates to a method for generating an NC (numerical control) program which is used when an NC machine equipped with an end mill serving as a cutting tool cuts into a complex form such as a mold, and which reduces wear and damage to the cutting tool and thereby permits efficient cutting, and an apparatus, and a computer memory and program products for implementing the above-mentioned method.

2. Description of the Related Art

Molds for molding various industrial products are fabricated generally by machining of metal materials by using an NC machine equipped with an end mill serving as a cutting tool. In fabrication of such a mold, shape design is first carried out using a CAD (computer aided design) system, and then machining process design is carried out using a CAM (computer aided manufacturing) system. On the basis of this process design, machining is carried out using an NC machine.

Nevertheless, in the above-mentioned process design carried out using the CAM system on the basis of the shape data given from the CAD system, the resultant data contains merely geometry-related data for the machining processes such as: the selection of cutting tools (end mills) to be used; and the tool paths for the selected cutting tools. Thus, in order that the NC machine can actually perform the machining, an NC program needs to be generated on the basis of the result of the process design carried out by the CAM system.

This NC program sets machining conditions in each portion along the tool paths for the cutting tools determined as described above. Generally in the prior art, the NC program is generated manually by an operator on the basis of the operator's experience. In an exemplary case where an end mill is used as a cutting tool, the major cutting condition to be set is the feed rate along the tool path, or more specifically, the amount of feed per tooth (mm/tooth) for the teeth arranged along the periphery of the end mill.

In the generation of the NC program, it is desired to reduce wear in the cutting tools, avoid damage such as chipping to the cutting tools, and thereby extend the life of the cutting tools. At the same time, it is desired to reduce machining time as much as possible. An NC program satisfying these contradictory requirements is laborious to generate even for an experienced operator. Further, in generation of an NC program used for machining of a mold having a complex shape to be cut, it is substantially impossible to optimize the feed rate along the entire tool paths.

As such, in generation of an NC program in the prior art, the reduction of wear and the avoidance of damage to the cutting tools have been prioritized, while the machining conditions, such as feed rate, have been set lower with a margin for safety. This has caused the problem that the machining time is not reduced satisfactorily.

In order to resolve such a problem, NC machines have been developed in which during the machining according to an NC program generated in advance, the actual load exerted on the cutting tool is detected, whereby the numerical control commands corresponding to the machining conditions are corrected in real time by feedback based on the result of the detection. For example, Reissued PCT International Publication No. WO98/19822 discloses an NC machine in which the actual load exerted on the cutting tool is detected, whereby a simulation of the machining situation at future machining positions is carried out on the basis of the result of the detection, and whereby the numerical control commands corresponding to the machining conditions are corrected by feedforward based on the result of the simulation.

Nevertheless, in the former apparatuses carrying out feedback control based on the result of detection of the load on the cutting tool, there is the problem that a sudden load change can cause a delay in the machining condition correction. When the control gain is increased in order to reduce the delay, another problem can occur that an excessive correction is carried out for the sudden load change. As such, there has been a difficulty in setting of the control gain to an appropriate value.

On the other hand, in the latter apparatus carrying out feedforward control based on the result of detection of the load on the cutting tool, there is the problem that when the simulation is carried out on the basis of an incidental external disturbance, such as chip jamming around the cutting tool and local variation in the material characteristics, inappropriate correction can be carried out. When the control gain is reduced in order to reduce such a problem, another problem can occur that the normal feedforward correction of the machining conditions delays for ordinary load changes. As such, there has been a difficulty in setting of the control gain to an appropriate value.

In order to compensate the above-mentioned problems in the feedback system and the feedforward system, both systems may be used in combination. Nevertheless, such a combination results in a complex control system, and thereby causing an enhanced difficulty in setting of the control gains to appropriate values.

BRIEF SUMMARY OF THE INVENTION

The invention has been devised in order to resolve the above-mentioned problems. An object of the invention is to provide an NC program generating method and apparatus in which when tool paths are determined in a process design using a CAM system, machining conditions in each portion along the tool paths are determined in advance by a simple method, whereby an NC program containing the machining conditions is generated automatically. Another object of the invention is to provide computer memory and program products for implementing the above-mentioned method.

An aspect of the invention is a method for generating a program used for NC machining in which an end mill having a plurality of teeth arranged along the periphery thereof and rotating around the axis thereof is fed along a tool path defined on a machined surface for machining the machined surface into a predetermined shape, the method comprising the steps of calculating, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of the end mill in each portion along the tool path by using the size of an end mill to be used for machining, the cutting depth in the radial direction of the end mill, and the amount of feed per tooth; obtaining an estimated value of the cutting force in each portion along the tool path by applying the result of the calculation to a response surface whose explanation variables are composed of the maximum undeformed chip thickness, the cutting arc length or the engage angle, and the active angle or the axial depth of cut; and determining the feed rate of the end mill in each portion along the tool path to maintain the estimated value of the cutting force at an appropriate value.

Another aspect of the invention is an apparatus for generating a program used for NC machining in which an end mill having a plurality of teeth arranged along the periphery thereof and rotating around the axis thereof is fed along a tool path defined on a machined surface for machining the machined surface into a predetermined shape, the apparatus comprising: calculating means for calculating, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of the end mill in each portion along the tool path by using the size of an end mill to be used for machining, the cutting depth in the radial direction of the end mill, and the amount of feed per tooth; obtaining means for obtaining an estimated value of the cutting force in each portion along the tool path by applying the result of the calculating means to a response surface whose explanation variables are composed of the maximum undeformed chip thickness, the cutting arc length or the engage angle, and the active angle or the axial depth of cut; and means for determining the feed rate of the end mill in each portion along the tool path to maintain the estimated value of the cutting force obtained by the obtaining means at an appropriate value.

Further another aspect of the invention is a computer memory product readable by a computer to execute a method for generating a program used for NC machining in which an end mill having a plurality of teeth arranged along the periphery thereof and rotating around the axis thereof is fed along a tool path defined on a machined surface for machining the machined surface into a predetermined shape, the computer memory product comprising: calculating, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of the end mill in each portion along the tool path by using the size of an end mill to be used for machining, the cutting depth in the radial direction of the end mill, and the amount of feed per tooth; obtaining an estimated value of the cutting force in each portion along the tool path by applying the result of the calculation to a response surface whose explanation variables are composed of the maximum undeformed chip thickness, the cutting arc length or the engage angle, and the active angle or the axial depth of cut; and determining the feed rate of the end mill in each portion along the tool path to maintain the estimated value of the cutting force at an appropriate value.

Further another aspect of the invention is a computer program product for use with NC machine, comprising: a computer usable storage medium having a computer readable program code embodied therein for generating a program used for NC machining in which an end mill having a plurality of teeth arranged along the periphery thereof and rotating around the axis thereof is fed along a tool path defined on a machined surface for machining the machined surface into a predetermined shape, the computer readable program code comprising: causing a computer to calculate, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of the end mill in each portion along the tool path by using the size of an end mill to be used for machining, the cutting depth in the radial direction of the end mill, and the amount of feed per tooth; causing a computer to obtain an estimated value of the cutting force in each portion along the tool path by applying the result of the calculation to a response surface whose explanation variables are composed of the maximum undeformed chip thickness, the cutting arc length or the engage angle, and the active angle or the axial depth of cut; and causing a computer to determine the feed rate of the end mill in each portion along the tool path to maintain the estimated value of the cutting force at an appropriate value.

In the invention, in each portion along the end-mill tool paths determined in the shape design using a CAD system and the process design using a CAM system, a maximum undeformed chip thickness, a cutting arc length or an engage angle, and an active angle for each tooth of the end mill are calculated when a ball end mill is used in machining, or the maximum undeformed chip thickness, the cutting arc length or the engage angle, and an axial depth of cut for each tooth of the end mill are calculated when a straight end mill is used in machining, on the basis of the geometrical relation with the corresponding machined surface. The result of the calculation is applied to a response surface corresponding to the explanation variables composed of these values, whereby an estimated value of the cutting force exerted on the end mill is obtained accuracy. Then, the feed rate incorporated in an equation expressing the maximum undeformed chip thickness is determined such that the estimated value of the cutting force is maintained at a predetermined appropriate value at each position. As described above, the feed rate is defined as the amount of feed per tooth (mm/tooth) for the teeth arranged along the periphery of the end mill.

The above and further objects and features of the invention will more fully be apparent from the following detailed description with accompanying drawings.

DETAILED DESCRIPTION OF THE PREFERRED EMBODIMENTS

The invention is described below with reference to the drawings.

Figure 1:
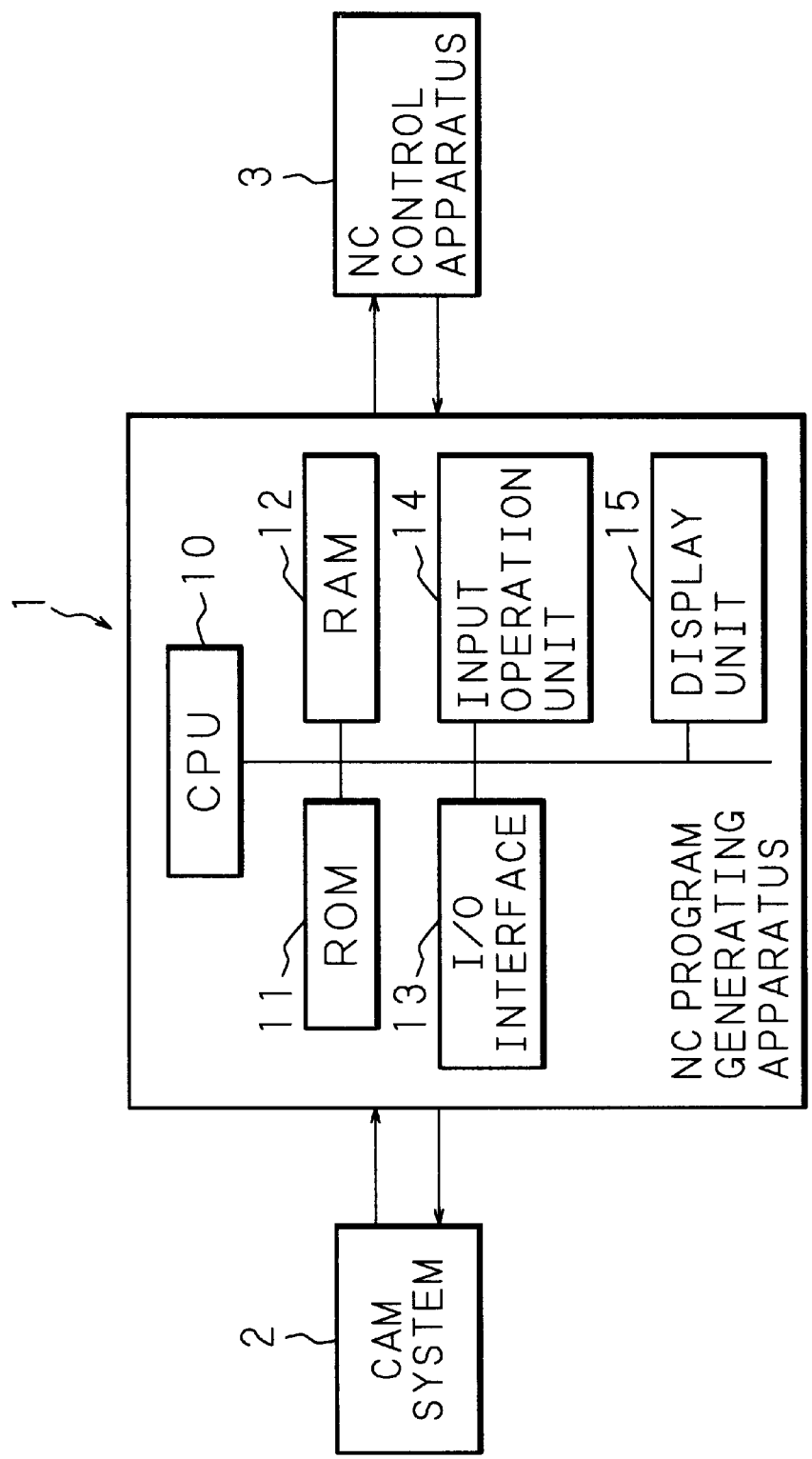
FIG. 1 is a block diagram showing the configuration of an NC program generating apparatus used in the implementation of a method according to an embodiment of the invention.

FIG. 1 is a block diagram showing the configuration of an NC program generating apparatus used in the implementation of an NC program generating method according to the invention (a method according to the invention, hereafter). As shown in the figure, the NC program generating apparatus 1 is composed of a computer comprising: a CPU (Central Processing Unit) 10 serving as an processing unit; a ROM (Read Only Memory) 11 for storing procedures of a method according to the invention; and a RAM (Random Access Memory) 12 for temporarily storing variables used in later-described calculations (including intermediate quantities during the calculations) such as shapes of machined surface before and after machining, the size of end mills used in machining, tool paths set for the end mills, and the like.

The NC program generating apparatus 1 is connected to a CAM system 2 and an NC control apparatus 3 via an input and output (I/O) interface 13. In the CAM system 2, process design is carried out for the process in which a workpiece (mold) designed using a CAD system (not shown) is fabricated by machining. In the process design, machining procedures (selection of end mills to be used in the machining and determination of tool paths for the selected end mills) are determined, and process contents in each procedure are determined, and CL (Cutter Location) data is generated. The result of the process design is given to the NC program generating apparatus 1 via the I/O interface 13. The NC program generating apparatus 1 generates an NC program on the basis of the result of the process design given from the CAM system 2.

The NC control apparatus 3 controls and causes an NC machine (not shown) to carry out machining according to the NC program generated by the NC program generating apparatus 1 and then given through the I/O interface 13. In FIG. 1, information is transmitted on line between the NC program generating apparatus 1 and the CAM system 2 or the NC control apparatus 3. Alternatively, these apparatuses may be configured off line, whereby the information may be exchanged using an appropriate recording media such as magnetic disks or optical disks.

Further, the NC program generating apparatus 1 for carrying out later-described calculations may be configured such as to be included in the CAM system 2, whereby the combined system may carry out total processes from the process design to the NC program generation based on the mold shape data given from the CAD system. Furthermore, the CAD system also may be included in the combined system composed of the NC program generating apparatus 1 and the CAM system 2, whereby this further combined system may carry out total processes from the mold design, through the process design, to the NC program generation.

The NC program generating apparatus 1 further comprises an input operation unit 14 composed of a keyboard, a mouse, and the like to be operated by an operator. Further provided is a display unit 15 composed of a CRT display, a liquid crystal display, or the like for displaying various information obtained in each step of the later-described calculations. In response to the display on the display unit 15, the operator can operate the input operation unit 14, and thereby intervene each step of the later-described calculations.

The NC program generating apparatus 1 having the above-mentioned configuration calculates the end-mill feed rate in each portion of the tool paths for the end mills used in the mold machining obtained as the result of the above-mentioned process design carried out using the CAM system 2. On the basis of the combination of the feed rate obtained by this calculation and the tool path, an NC program is generated for the mold machining.

Figure 2:
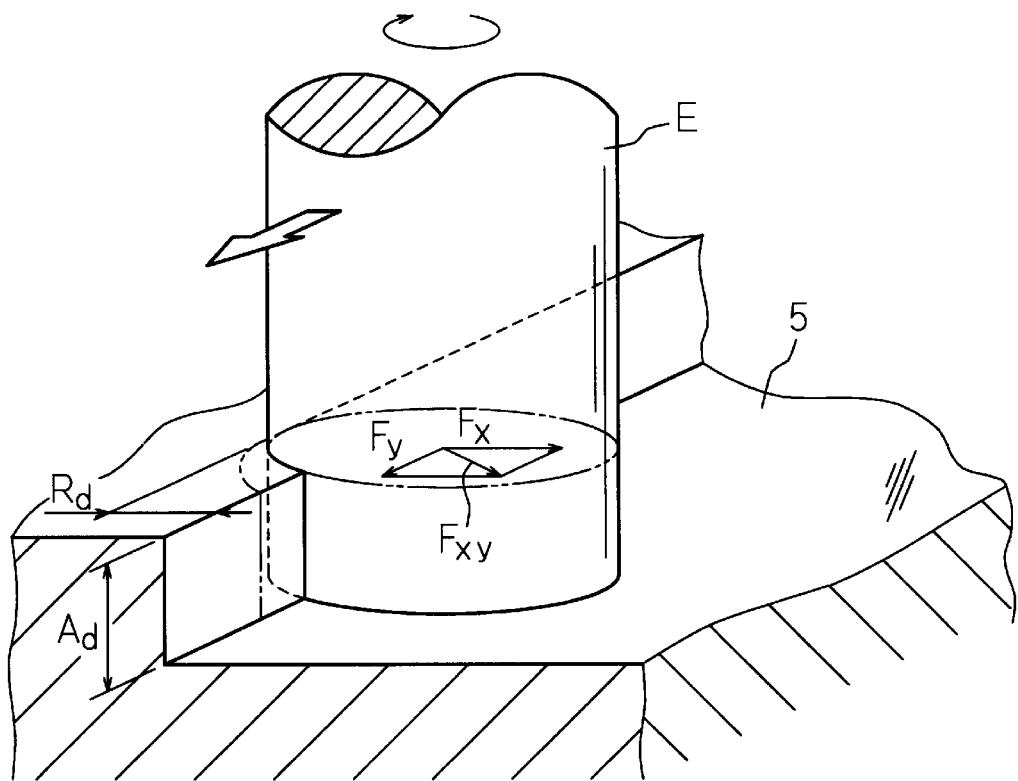
FIG. 2 is a perspective view showing the situation of machining by a straight end mill.
Figure 3:
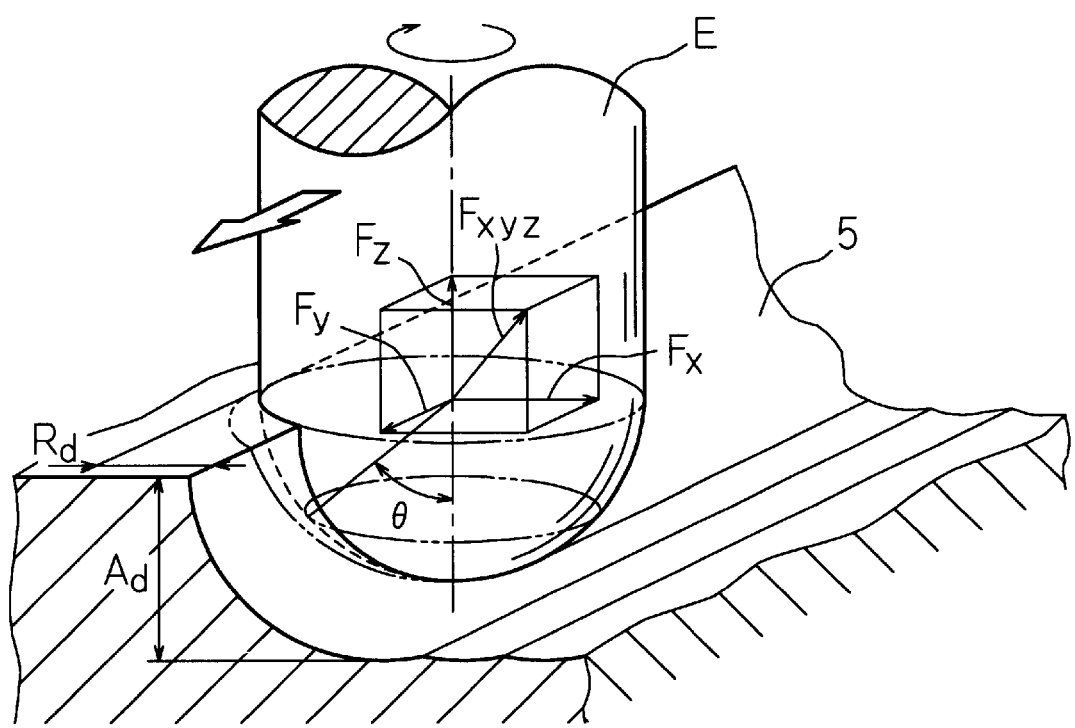
FIG. 3 is a perspective view showing the situation of machining by a ball end mill.

FIG. 2 and FIG. 3 are perspective views showing the situation of machining by end mills. An end mill E shown in FIG. 2 is a straight end mill which has the shape of a cylinder with a flat tip and which comprise a plurality of teeth extending radially from the center of the tip surface and spirally in the side periphery in the vicinity of the tip surface. Another end mill E shown in FIG. 3 is a ball end mill which has the shape of a cylinder with a hemisphere-shaped tip and which comprise a plurality of teeth extending radially from the center of the hemisphere across the entirety. Each end mill E rotates in the direction indicated by an arrow shown in each figure, travels in the direction indicated by a white arrow shown in each figure, and thereby machines a workpiece 5.

Figure 4:
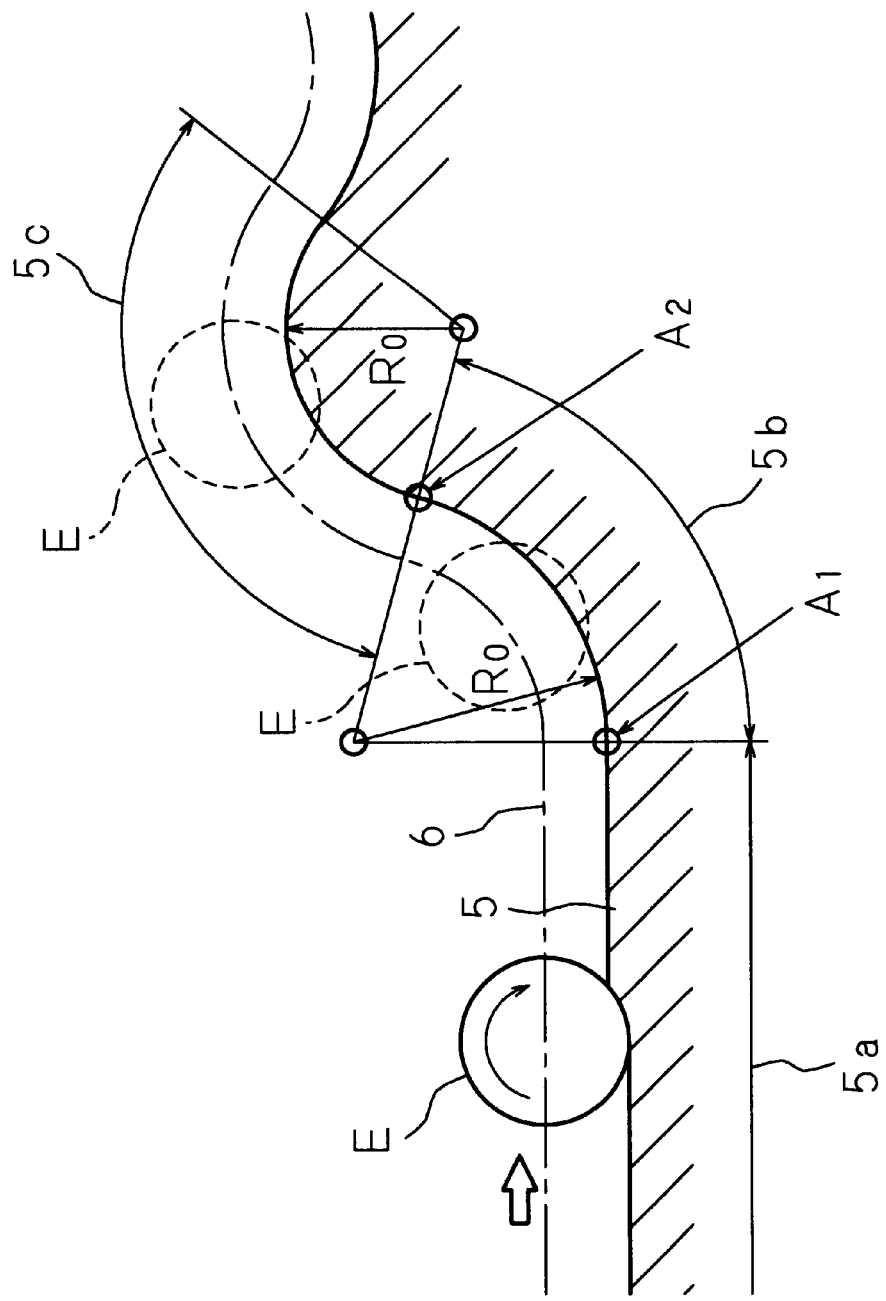
FIG. 4 is a cross sectional plan view showing the situation of machining by an end mill.

FIG. 4 is a cross sectional plan view showing the situation of machining by an end mill. When viewed in a cross section perpendicular to the axis, the situation of machining by the end mill E is common to both straight and ball end mills. A cross section of the workpiece 5 (mold) cross-hatched in the figure is machined by the teeth provided in the outer surface of the end mill E during the process in which the end mill E rotates in the direction indicated by the arrow shown in the figure, and travels along a tool path 6 defined outside the cross section in the direction indicated by the white arrow shown in the figure.

The outer shape of the cross section of the workpiece 5 comprises a straight portion 5a, an inner arc (concave) portion 5b, and an outer arc (convex) portion 5c as shown in the figure. The inner arc portion 5b is a portion the curvature center of which is located outside the workpiece 5 and which is concave toward the inside. In contrast, the outer arc (convex) portion 5c is a portion the curvature center of which is located inside the workpiece 5 and which is convex toward the outside. The inner arc portion 5b and the outer arc (convex) portion 5c can be formed by an arbitrary combination of various curves such as circles, ellipses, parabolas, and hyperbolas. In the subsequent procedures in the invention, the arc potions 5a and 5b are approximated with a circular arc or circular arcs. When further necessary, the portions are approximated with a combination of a circular arc and a straight line, or alternatively, circular arcs and straight lines.

In the process design carried out in the CAM system 2, tool paths 6 described above are defined as a plurality of steps each corresponding to a pitch given by the cutting depth in the radial direction (radial depth of cut $R_d$: see FIG. 2 and FIG. 3) in each shaping step from the raw material to the final shape along each machining cross section of the workpiece 5 corresponding to a pitch given by the amount of cut in the axial direction (an axial depth of cut $A_d$: see FIG. 2 and FIG. 3) of the end mill E. The tool paths 6 defined as described above are given to the NC program generating apparatus 1 together with other information necessary for the later-described feed rate calculations, such as the size and the type of the end mill E.

Figure 5A:
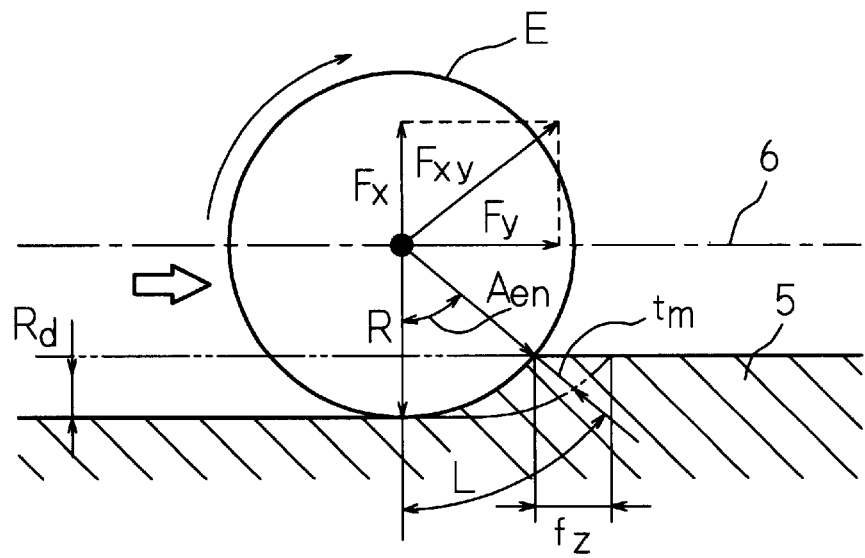
FIG. 5A and FIG. 5B illustrate a method for calculating feed rate.
Figure 5B:
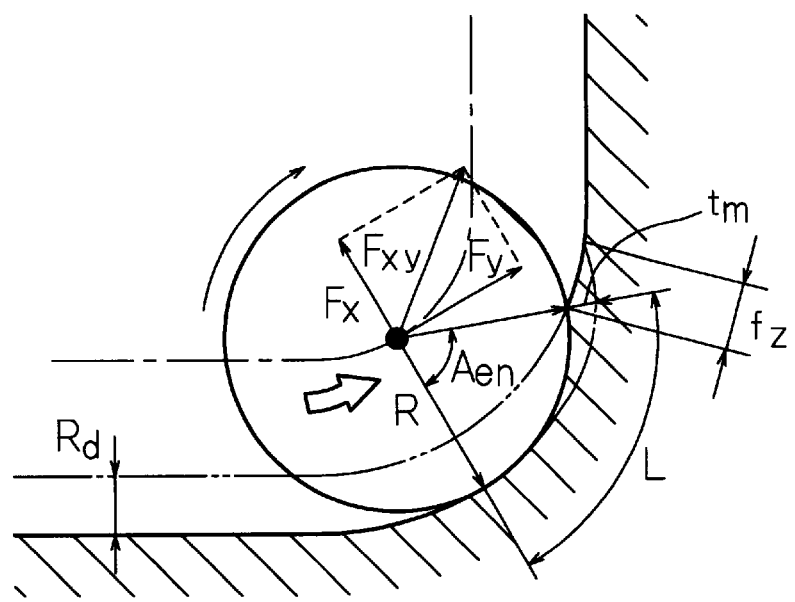

FIG. 5A and FIG. 5B illustrate a method for calculating the feed rate carried out in the NC program generating apparatus 1. FIG. 5A shows the situation of machining of the straight portion 5a in the workpiece 5. As shown in the figure, the straight portion 5a is machined successively by the amount of the radial depth of cut $R_d$ during the process in which the end mill E having its axis aligned with the tool path 6 parallel to the straight portion 5a rotates in the direction indicated by the arrow shown in the figure, and travels in the direction indicated by the white arrow shown in the figure. At this time, the end mill E, more specifically the teeth around the end mill E, receives a cutting force $F_{xy}$ within the two-dimensional plane (X–Y plane) containing the tool path 6. The force $F_{xy}$ is a resultant force between a cutting force $F_y$ in the feeding direction and a cutting force $F_x$ in a direction perpendicular to the feeding direction. A method according to the later-described procedures of the invention is applicable not only to climb cutting in which the end mill E rotates in the direction indicated by the arrow, but also to conventional cutting in which the end mill E rotates in the direction reverse to that indicated by the arrow.

In the invention, the cutting force $F_{xy}$ exerted on the end mill E in each portion of the tool path 6 is estimated, whereby the feed rate of the end mill E is determine to maintain the estimated value within an appropriate range which is determined for reducing wear and damage of the teeth of the end mill. For this purpose, the estimated value of the cutting force $F_{xy}$ exerted on the end mill E during the machining needs to be calculated. As described below, the estimated value is obtained by the response surface methodology used as an approximation technique in optimization in various design problems. Further, in order to avoid variation in the remained amount of cut caused by deflecting of the end mill E from the normal direction, and thereby maintain the remained amount of cut at constant, the estimated value of the cutting force $F_x$ in a direction perpendicular to the feeding direction may be calculated similarly.

When the end mill E used in machining is a straight end mill as shown in FIG. 2, the cutting forces $F_x$ and $F_y$ exerted on the end mill E are substantially identical to each other in each cross section within the length of the axial depth of cut $A_d$. Accordingly, on the machining condition that the axial depth of cut $A_d$ is constant, the estimated value of the cutting force $F_{xy}$ which is a resultant force between the two cutting forces is obtained from a two-variable response surface depending on two explanation variables of the estimated maximum undeformed chip thickness $t_m$ and the cutting arc length L shown in FIG. 5.

The estimated maximum undeformed chip thickness $t_m$ is the chip thickness expected to be cut by each of the teeth arranged on the periphery in circumferencial direction of the end mill E. The cutting arc length L is the length of contact between the periphery of the end mill E under machining and the machined surface of the workpiece 5. The maximum undeformed chip thickness $t_m$ and the cutting arc length L in machining the straight portion 5a shown in FIG. 5A are calculated according to the following Equations (1) and (2) which are obtained from a geometrical relation.

$$L = R \cdot A_{en} \quad (1)$$

$$t_m = f_z \cdot \sin A_{en} \quad (2)$$

R in Equation (1) denotes an end mill radius (radius of the end mill E), and is a known value given from the CAM system 2 to the NC program generating apparatus 1 as the result of the process design. Further, $f_z$ in Equation (2) denotes the amount of feed per tooth (mm/tooth) which is obtained as the product among the feed rate (mm/min) of the end mill E along the tool path 6, the rotation speed of the end mill E, and the number of teeth around the end mill E. In a subsequent procedure, the amount of feed per tooth $f_z$ is calculated as the feed rate. $A_{en}$ in Equation (2) denotes an engage angle which is the arc angle within the machining plane corresponding to the portion of contact between the periphery of the end mill E under machining and the machined surface of the workpiece 5. The engage angle $A_{en}$ is calculated from the radius R of the end mill E and the radial depth of cut $R_d$ according to the following Equation (3).

$$A_{en} = \cos^{-1}\{(R - R_d)/R\} \quad (3)$$

Assuming that a single tooth is solely relating to the cutting regardless of the phase and the rotational angle of the end mill E, the quantities L and $t_m$ obtained from Equations (1) and (2) for the tooth determine the cutting force $F_{xy}$ exerted on the end mill E.

Figure 6:
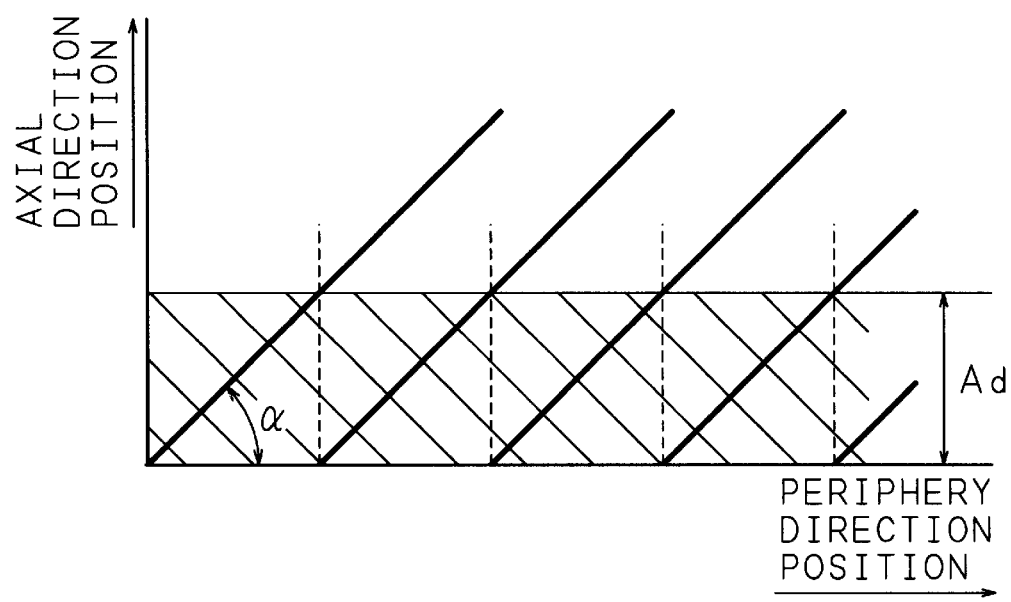
FIG. 6 shows the geometrical arrangement of the teeth arranged on the periphery of an end mill.

FIG. 6 shows the geometrical arrangement of the teeth along the periphery of the end mill E. The horizontal axis of the graph indicates the position in the periphery directions of the end mill E, while the vertical axis indicates the position in the axial directions. The teeth of the end mill E are formed spirally in the periphery of the end mill E. In the figure, the teeth are shown as straight lines inclined at a predetermined inclination angle (helix angle) $\alpha$ with respect to the horizontal axis and arranged with a horizontal pitch corresponding to the number of the teeth.

In FIG. 6, the rotation of the end mill E corresponds to a travel in the horizontal axis direction. Accordingly, when the amount of cut in the axial direction (the axial depth of cut) of the end mill E is denoted by $A_d$, the number of teeth relating to the cutting at a rotational angle is given by the number of teeth contained in a region (hatched region in the figure) having the length $A_d$ in the vertical axis direction. Accordingly, when the axial depth of cut $A_d$ is set to be a length corresponding to the arrangement pitch of the teeth, obtained is the machining situation that a single tooth is solely relating to the cutting, as shown in the figure.

In case of a straight end mill E comprising six teeth and having an inclination angle (helix angle) of $\alpha = 45°$ and a diameter of 10 mm, when the axial depth of cut $A_d$ is set to be 5.24 mm ($= 10\pi/6$), achieved is the above-mentioned machining situation that a single tooth is solely relating to the cutting. Such machining situation is assumed in the following description.

The axial depth of cut Ad may be set to be an integer multiple of the previous $A_d$ (=5.24 mm). Then, achieved is the machining situation that a plurality of teeth are relating to the cutting at the same time. In this case, the cutting force $F_{xy}$ is shared by the plurality of teeth. Thus, when the feed rate is obtained according to a later-described procedure, a correction is necessary with considering the number of teeth relating to the cutting.

When an arbitrary quantity other than the above-mentioned axial depth of cut is set, the number of teeth relating to the cutting varies during the rotation of the end mill E. In this case, when the subsequent calculation is carried out with the assumption that the greater number is adopted as the nominal number of teeth relating to the cutting. This gives a feed rate on the safer side in terms of wear and damage to the teeth.

The response surface is given as a quadratic polynomial used for obtaining an estimated value Y depending on a plurality of explanation variables $X_i$(i=1 ... n). In case of two explanation variables $X_1$ and $X_2$, the response surface is general y expressed by the following Equation (4).

$$Y=\beta_0+\beta_1 X_1+\beta_2 X_2+\beta_{11} X_1^2+\beta_{22} X_2^2+\beta_{12} X_1 X_2 \quad (4)$$

Accordingly, the response surface depending on the explanation variables of the maximum undeformed chip thickness $t_m$ and the cutting arc length L and having the estimated value of the cutting force $F_{xy}$ is expressed by the following Equation (5) where $X_1$, $X_2$, and Y in Equation (4) are replaced by $t_m$, L, and $F_{xy}$, respectively.

$$F_{xy}=\beta_0+\beta_1 t_m+\beta_2 L+\beta_{11} t_m^2+\beta_{22} L^2+\beta_{12} t_m L \quad (5)$$

Unknown coefficients βs in Equation (5) are determined using a plurality of combinations of measurement points and a response value corresponding thereto according to the least square method in regression analysis. The cutting arc length L is uniquely determined by substituting the result of process design given from the CAM system 2, into Equation (1). In contrast, the maximum undeformed chip thickness $t_m$ expressed by Equation (2) depends on the amount of feed per tooth $f_z$ which is a function of the feed rate of the end mill E, as described above. Thus, assuming an appropriate feed rate, a maximum undeformed chip thickness $t_m$ is obtained. Then, substituting this maximum undeformed chip thickness $t_m$ together with the cutting arc length L obtained from Equation (1), into Equation (5), the estimated value of the cutting force $F_{xy}$ is obtained. When an adjustment is carried out such that this estimated value falls within an appropriate range determined such as to reduce wear and damage to the teeth as described above, an appropriate feed rate is determined.

In order that the mathematical model expressed by Equation (5) holds, chips generated in the cutting need to be removed so as not to wind around the end mill E, thereby causing no extra cutting force. In recent fabrication of molds, materials having a high hardness are directly machined with end mills composed of cemented carbide. In such a case, selecting an appropriate machining condition, a desirable situation is achieved that the chips do not wind around the end mill. At that time, the cutting force $F_{xy}$ is estimated accurately according to Equation (5).

Equation (1) expressing the cutting arc length L and Equation (2) expressing the maximum undeformed chip thickness $t_m$ are valid for the cutting of the straight portion 5a shown in FIG. 5A. In contrast, in the cutting of the inner arc (concave) portion 5b shown in FIG. 5B, the cutting arc length L becomes greater, while the maximum undeformed chip thickness $t_m$ becomes smaller. On the contrary, in the cutting of the outer arc (convex) portion 5c shown in FIG. 4, the cutting arc length L becomes smaller, while the maximum undeformed chip thickness $t_m$ becomes greater.

Figure 7:
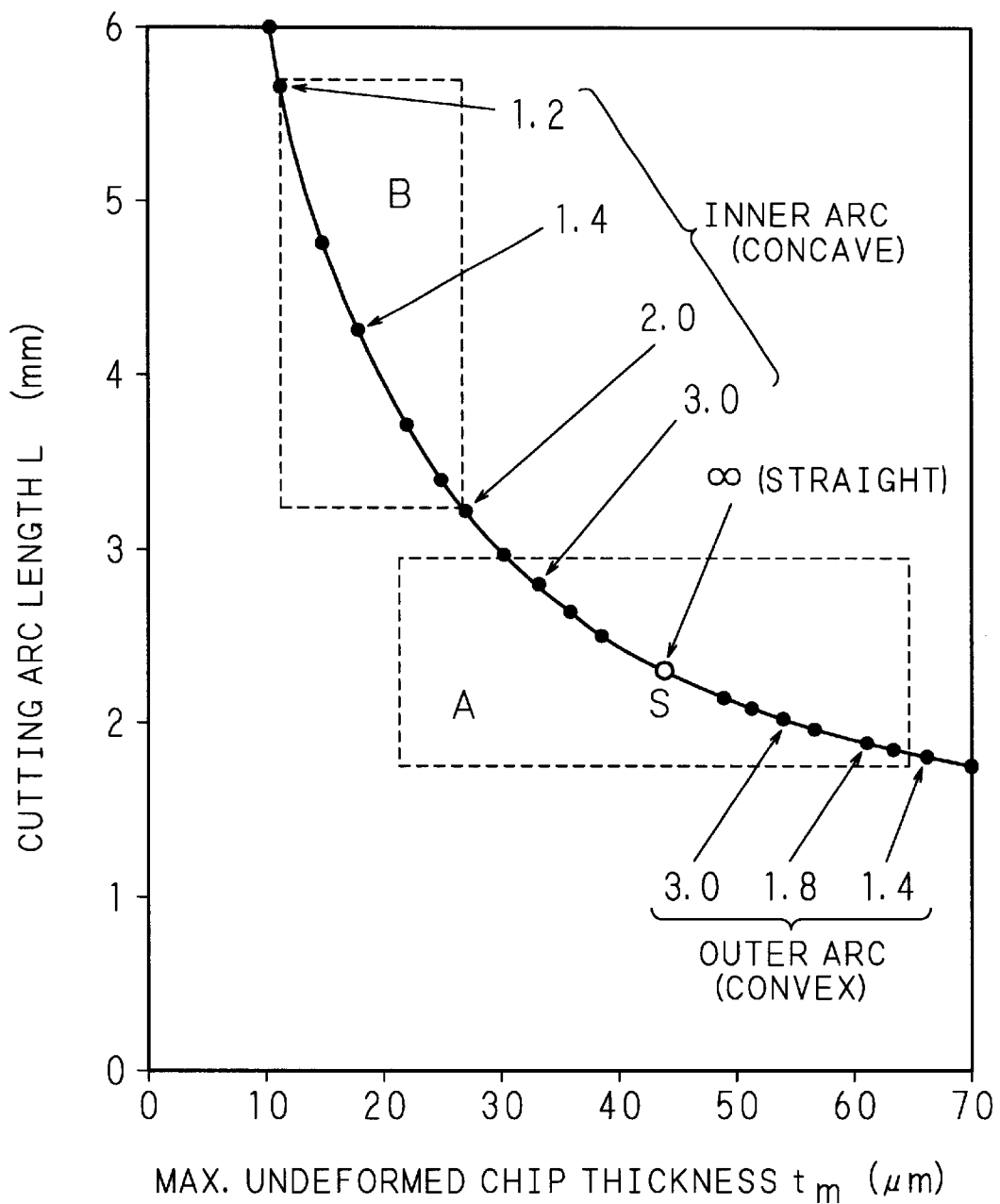
FIG. 7 is a graph showing the relation between the cutting arc length and the maximum undeformed chip thickness for various curvature radii.

The quantities L and $t_m$ in the inner arc (concave) portion 5b and the outer arc (convex) portion 5c are affected by the curvature radii $R_O$ (see FIG. 2) of the arc potions 5a and 5b. A graph of FIG. 7 shows a curve obtained by a test along which measured cutting force is constant, and shows the relation between the cutting arc length L and the maximum undeformed chip thickness $t_m$ for various curvature radius $R_O$. Point S in the figure indicates the values L and $t_m$ for the case of a curvature radius $R_O$ of infinity, that is, for the straight portion 5a. Points on the left of point S indicate the values L and $t_m$ for the inner arc (concave) portion 5b, while points on the right of point S indicate the values L and $t_m$ for the outer arc (convex) portion 5c. A number added to each point denotes the ratio of the curvature radius $R_O$ of the arc portion 5b or 5c to the radius R of the end mill E.

As shown in the figure, in the cutting of the inner arc (concave) portion 5b having a greater curvature radius $R_O$ and in the cutting of the outer arc (convex) portion 5c across its substantial entirety, that is, in the cutting within region A shown in the figure, changes in the cutting arc length L and the maximum undeformed chip thickness $t_m$ are substantially corresponding to each other. Accordingly, the points are located along a smooth curve. In contrast, in the cutting within a region having a smaller curvature radius $R_O$ ($R_O/R$ is approximately unity), that is, in the cutting of the inner arc (concave) portion 5b within region B substantially distant from region A, the maximum undeformed chip thickness $t_m$ is substantially small. Accordingly, it is expected that the cutting characteristics varies substantially due to a scale effect, and that the cutting force $F_{xy}$ increases rapidly.

Figure 8:
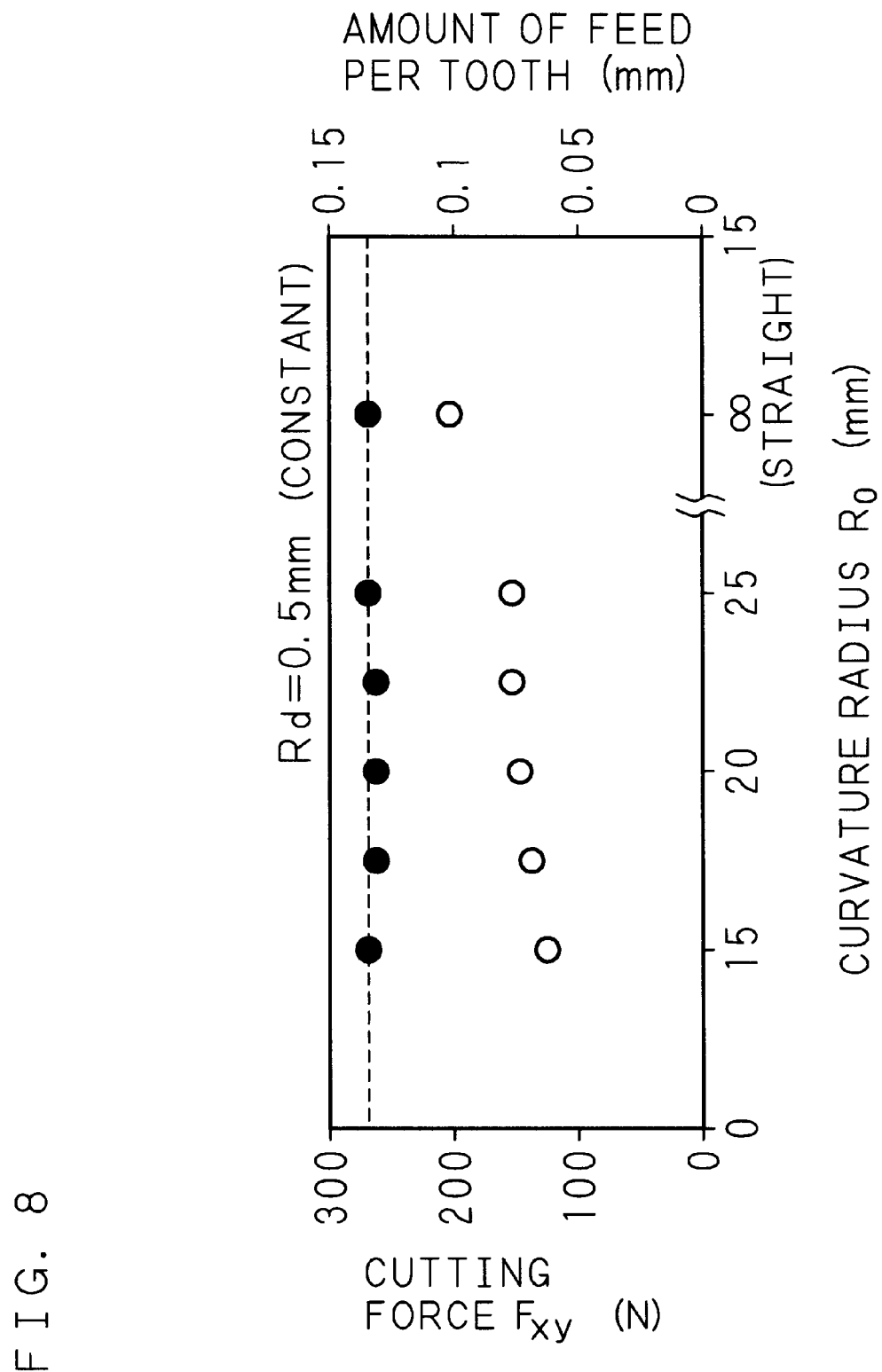
FIG. 8 is a graph showing the actually measured values of the cutting force in the machining of inner arc (concave) portions having various curvature radii.

FIG. 8 is a graph showing the measured values of the cutting force $F_{xy}$ in the machining of the inner arc (concave) portion 5b having various curvature radii, when the amount of feed per tooth $f_z$ is calculated such that the cutting force equals that for straight cutting according to Equation (5) applicable to the straight portion 5a. In this machining, an end mill E having a diameter of 10 mm was used, and the radial depth of cut $R_d$ was 0.5 mm (constant).

White circles in the figure indicate the amount of feed per tooth $f_z$, while black circles indicate the measured cutting force $F_{xy}$. A broken line indicates the estimated value of $F_{xy}$ in case of straight cutting on the same condition. As seen from the figure, the estimated value of $F_{xy}$ according to Equation (5) is in good agreement with the measured values on the condition that the curvature radius $R_O$ is 15 mm or greater ($R_O/R$ is 3.0 or greater). As shown in FIG. 7, the machining situation of the inner arc (concave) portion 5b having a value $R_O/R$ being 3.0 or greater goes through a point S corresponding to straight cutting, and connects to a smooth curve expressing the machining situation of the outer arc (convex) portion 5c across its substantial entirety. That is, the cutting force $F_{xy}$ within region A shown in FIG. 7 is estimated accurately according to Equation (5) originally applicable to straight cutting.

In contrast, when $R_O/R$ is less than 3.0, that is, within region B shown in FIG. 7, the relation between the cutting arc length L and the maximum undeformed chip thickness $t_m$ is substantially different from that within region A. Thus, the estimated value of the cutting force $F_{xy}$ according to Equation (5) is not expected to be sufficiently accurate. In this case, the estimated value of the cutting force $F_{xy}$ is calculated according to Equation (6) which has coefficients γs different from those in Equation (5) and depends on the explanation variables of the maximum undeformed chip thickness $t_m$ and the cutting arc length L.

$$F_{xy}=\gamma_0+\gamma_1 t_m+\gamma_2 L+\gamma_{11} t_m^2+\gamma_{22} L^2+\gamma_{12} t_m L \quad (6)$$

Similarly to the case of the coefficients βs, unknown coefficients γs in Equation (6) are determined using a plurality of combinations of measurement points and a response value corresponding thereto on the appropriate conditions within region B, according to the least square method.

As shown in FIG. 7, a wide range ($R_O/R$ becomes about 1.6) of the machining situation of the outer arc (convex)

portion 5c falls within region A. This indicates that the estimated value of the cutting force $F_{xy}$ within this wide range is calculated accurately according to Equation (5). However, even when the machining situation falls outside region A, the estimated value of the cutting force $F_{xy}$ tends to exceed the measured value. Further, the continuous length of the outer arc (convex) portion 5c having a smaller curvature radius is short in many cases. Accordingly, the feed rate can be determined successfully on the basis of the estimated value of the cutting force $F_{xy}$ according to Equation (5).

Table 1 shows a numerical example of the coefficients βs and γs appearing in Equations (5) and (6).

TABLE 1

| | | | |
|---|---|---|---|
| $\beta_0$ | 269.1 | $\gamma_0$ | 329.34 |
| $\beta_1$ | 65.84 | $\gamma_1$ | 67.53 |
| $\beta_2$ | 53.66 | $\gamma_2$ | 70.29 |
| $\beta_{11}$ | −3.783 | $\gamma_{11}$ | −2.40 |
| $\beta_{12}$ | 15.45 | $\gamma_{12}$ | 10.70 |
| $\beta_{22}$ | — | $\gamma_{22}$ | — |

Figure 9:
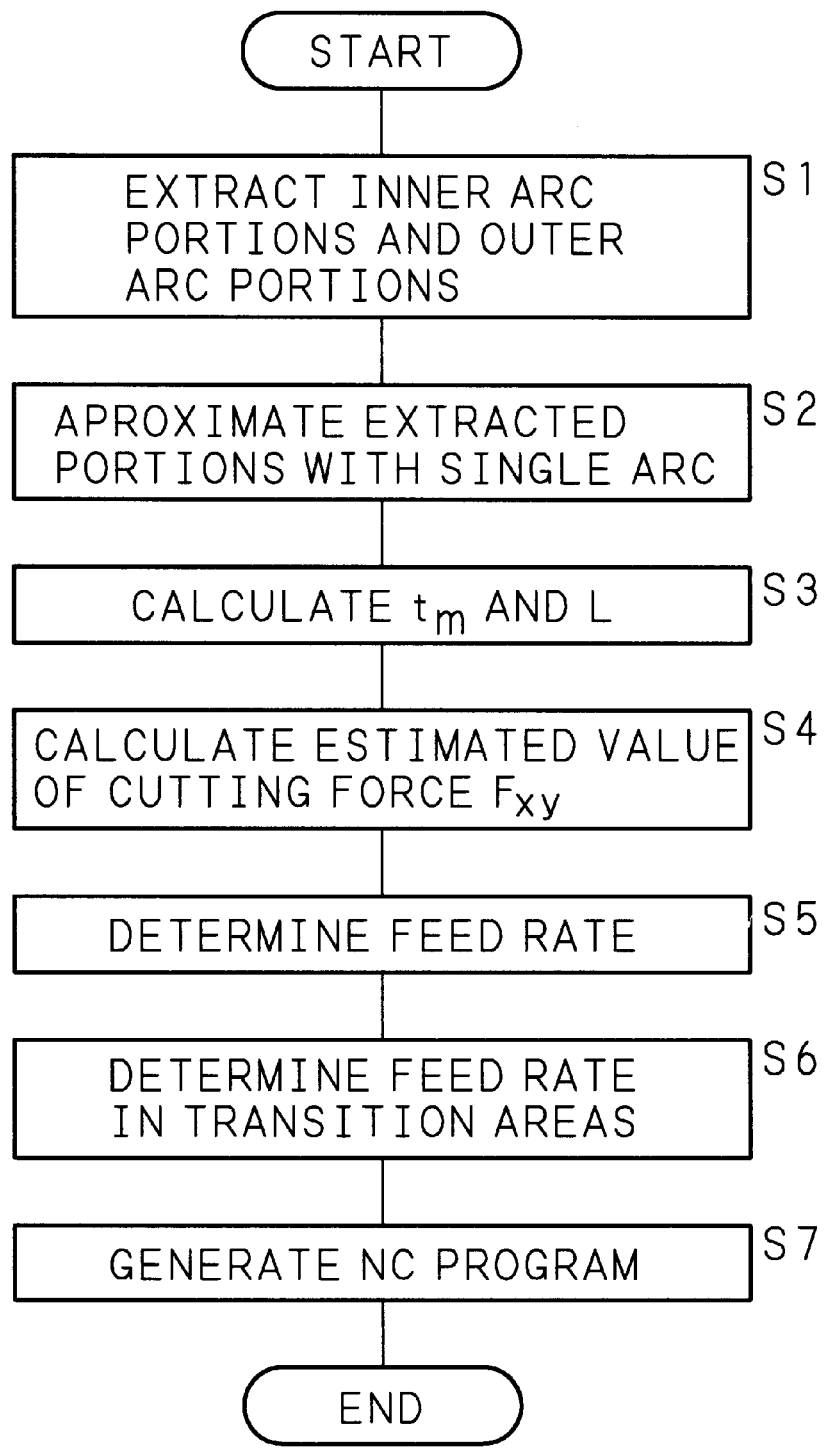
FIG. 9 is a flowchart showing the operation of an NC program generating apparatus.

FIG. 9 is a flowchart showing the operation of the NC program generating apparatus 1. The NC program generating apparatus 1 starts its operation, when receiving the data specifying the tool paths determined in the process design carried out in the CAM system 2, and when a predetermined start operation is carried out in the input operation unit 14. The NC program generating apparatus 1 extracts inner arc (concave) portions 5b and outer arc (convex) portions 5c from the tool path data (step S1), and then approximates each of the inner arc (concave) portions 5b and outer arc (convex) portions 5c with a single circular arc or a combination of circular arcs (step S2).

The NC program generating apparatus 1 calculates the maximum undeformed chip thickness $t_m$ and the cutting arc length L for each portion (step S3). The NC program generating apparatus 1 then extracts portions having a smaller curvature radius and thereby belonging to above-mentioned region B, among the inner arc (concave) portions 5b approximated with circular arcs. The NC program generating apparatus 1 applies the calculated values $t_m$ and L to the response surface expressed by Equation (6) for the extracted portions, and applies these values to the response surface expressed by Equation (5) for the other portions, whereby estimated values of the cutting force $F_{xy}$ are obtained (step S4). Then, the feed rate is determined such that the estimated values of the cutting force $F_{xy}$ are maintained at appropriate values (step S5).

In the above-mentioned description, the inner arc (concave) portions 5b have been separated into two regions A and B depending on the curvature radius, whereby a different Equation (5) or (6) has been applied to each group. However, the regions may be subdivided into a larger number, whereby a different estimation equation may be applied to each group, and whereby the feed rate may be calculated. Further, Equation (5) originally applicable to straight portions 5a has bee used for the outer arc (convex) portions 5c. However, another estimation equation similar to that used for the inner arc (concave) portions 5b may be applied to the outer arc (convex) portions 5c.

On completion of the above-mentioned calculations of the feed rate in respective portions, the NC program generating apparatus 1 calculates the feed rate in transition areas ($A_1$ and $A_2$ in FIG. 4) between the above-mentioned portions (step S6), then corresponds these portions appropriately, and thereby generates an NC program (step S7). The NC program generating apparatus 1 outputs the NC program to the NC control apparatus 3, and then terminates its operation.

The reason why the calculations of the feed rate in transition areas are necessary in step S4 is as follows. For example, as indicated by a broken line in FIG. 4, when the end mill E is located at transition point $A_1$ from a straight portion 5a to an inner arc (concave) portion 5b, the actually cutting portion of the end mill E has been entered into the inner arc (concave) portion 5b. Accordingly, if the feed rate is changed at this point, the inner arc (concave) portion 5b is machined at a higher feed rate appropriate to the cutting of the straight portion 5a. This causes the problem that the end mill E suffers an excessive cutting force. Similarly, if the feed rate of the end mill E is changed at transition point $A_2$ from the inner arc (concave) portion 5b to the outer arc portion 5c, the first portion of the outer arc portion 5c is machined at a lower feed rate appropriate to the cutting of the inner arc (concave) portion 5b. Accumulation of such delay causes an unnecessary extension in the overall process time for the machining of the workpiece 5.

In order to resolve such problems, transition areas have been set before the transition points $A_1$ and $A_2$ in step S4. Then, in these portions, the feed rate is gradually increased or reduced linearly to the values of the obtained feed rate before and after each transition point. The length of each transition area is preferably set different from each other depending on various factors such as: the radii $R_0$ in the inner arc (concave) portion 5b and the outer arc portion 5c before and after the transition point $A_1$ and $A_2$; the transition shapes in the transition points $A_1$ and $A_2$; the radius R of the end mill E to be used; and the radial depth of cut $R_d$. Accordingly, a preferable length of the transition area is determined in advance correspondingly to a diverse combination of these factors, whereby an appropriate length is selected for each transition area.

In the NC program generating apparatus 1, the feed rate is determined according to the above-mentioned procedures. Accordingly, an appropriate feed rate is easily determined for each portion of the tool paths given as the result of the process design carried out in the CAM system 2. This permits easy generation of an NC program for a mold having a complex shape, without the necessity of substantial amount of experience. The feed rate determined according to the invention is as high as possible on the condition that the end mill E serving as a cutting tool does not suffer an excessive load. Accordingly, in the machining according to the generated NC program, wear and damage to the end mill E are reduced. Further, a high accuracy is obtained, while the process time is reduced.

In the above-mentioned embodiment, a dedicated apparatus (NC program generating apparatus 1) for the invention has been used. However, without using such an apparatus, the above-mentioned procedures may be recorded as a computer program into a computer-readable recording medium. This recording medium may be mounted on a general-purpose computer, whereby the program may be loaded up. Then, the method according to the invention may be implemented using the CPU and the RAM of the computer as the processing unit and the storage unit of the invention.

Figure 10:
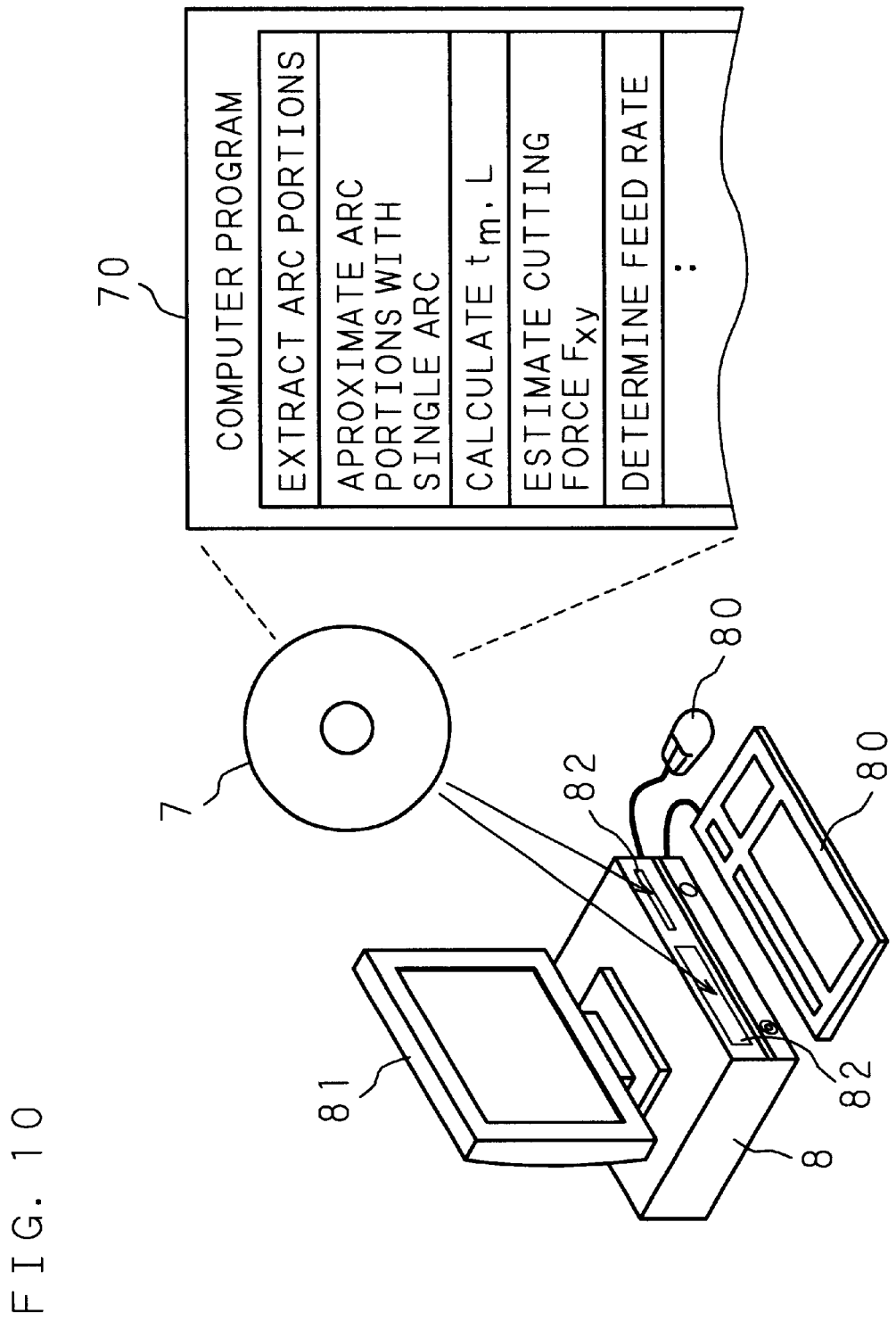
FIG. 10 is a schematic diagram illustrating another embodiment of the invention.

FIG. 10 is a schematic diagram illustrating such an embodiment.

In the figure, numeral 7 denotes a recording medium such as an optical disk or a magnetic disk. In the recording medium 7, a computer program 70 including program codes for causing a computer to execute the procedures corresponding to the respective steps shown in the flowchart of FIG. 9 is recorded.

The recording medium is mounted on a disk drive of a general purpose computer 8 comprising: inputting means 80 such as a keyboard and a mouse; and displaying means 81 such as a CRT display and a liquid crystal display; whereby the program is read out by the computer. Accordingly, the computer program 70 stored in the recording medium 7 is loaded up to the computer 8, whereby the computer 8 implements the method according to the invention.

In the above-mentioned embodiment, description has been made for a special case that the end mill E used in the machining is a straight end mill, and that the axial depth of cut $A_d$ is maintained at constant. However, the method according to the invention is applicable also to more general cases that the end mill E used in the machining is a straight end mill and whose axial depth of cut $A_d$ is varied, and that the end mill E used in the machining is a ball end mill as shown in FIG. 3. For example, in the case where the ball end mill is used in the machining, an active angle θ shown in FIG. 3 is used as an explanation variable in addition to the maximum undeformed chip thickness $t_m$ and the cutting arc length L (or the engage angle), whereby a three-variable response surface is used in a similar manner. Furthermore, in the case where the straight end mill is used in the machining, the axial depth of cut $A_d$ is used as an explanation variable in addition to the maximum undeformed chip thickness $t_m$ and the cutting arc length L (or the engage angle), whereby a three-variable response surface is used in a similar manner. Here, an active angle θ corresponds to the axial depth of cut $A_d$ in a machining process using a straight end mill as shown in FIG. 2.

Figure 11:
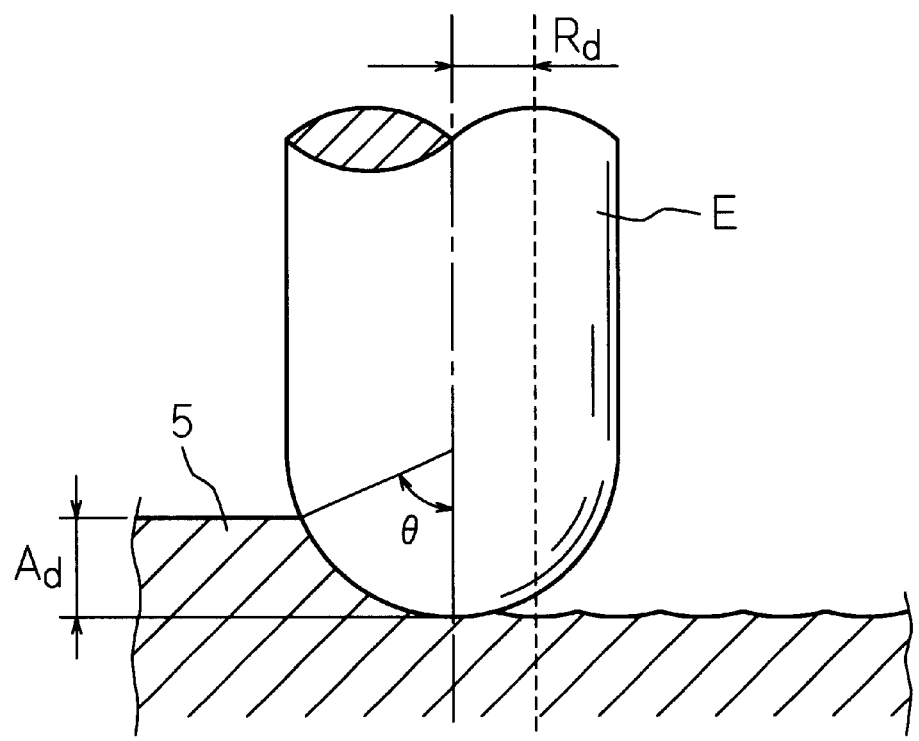
FIG. 11 illustrates an active angle.

FIG. 11 illustrates the active angle θ of a ball end mill. As shown in the figure, the active angle θ is defined as the angle between a radius where the hemisphere-shaped tip of the end mill E contacts with the workpiece 5 and the axis (dash-dotted line) of the end mill E, in an axis plane. Accordingly, the active angle θ indicates the length of the portion relating to the cutting along the outer periphery in the axis plane. In machining in a horizontal plane as shown in the figure, the range of the active angle θ relating to the cutting is $0 \leq \theta \leq \cos^{-1}(1 - A_d/R)$, which is seen from the figure.

In the machining using a ball end mill, a cutting force $F_z$ in the axial direction is exerted on each point of contact between the end mill E and the workpiece 5, in addition to the cutting forces $F_x$ and $F_y$. The values of these cutting forces vary with the active angle θ. Accordingly, the estimated value of the resultant cutting force $F_{xyz}$ which is exerted on the end mill E as a resultant force of these three cutting forces $F_x$, $F_y$ and $F_z$, is calculated on the basis of a response surface depending on an explanation variable of the active angle θ together with the other explanation variables of the maximum undeformed chip thickness $t_m$ and the cutting arc length L, as described below. Also in this case, in order to avoid variation in the remained amount of cut caused by deflecting of the end mill E from the normal direction, and thereby maintain the remained amount of cut at constant, the estimated value of the cutting force $F_x$ in a direction perpendicular to the feeding direction may be calculated similarly.

In case of three explanation variables $X_1$, $X_2$, and $X_3$, the general response surface is expressed by the following Equation (7).

$$Y = \beta_0 + \beta_1 X_1 + \beta_2 X_2 + \beta_3 X_3 + \qquad (7)$$
$$\beta_{11} X_1^2 + \beta_{22} X_2^2 + \beta_{33} X_3^2 +$$
$$\beta_{12} X_1 X_2 + \beta_{13} X_1 X_3 + \beta_{23} X_2 X_3$$

Accordingly, in the case where the ball end mill is used in machining, the estimated value of the cutting force $F_{xyz}$ is expressed by the following Equation (8) where $X_1$, $X_2$, $X_3$, and Y in Equation (7) are replaced by the maximum undeformed chip thickness $t_m$, the cutting arc length L (or the engage angle), the active angle θ, and the resultant cutting force $F_{xyz}$ respectively. In the following, explanation will be given to the ball end mill. However, in the case where the end mill is the straight end mill, the axial depth of cut $A_d$ may be used as the explanation variable instead of the active angle θ.

$$F_{xyz} = \beta_0 + \beta_1 t_m + \beta_2 L + \beta_3 \theta + \qquad (8)$$
$$\beta_{11} t_m^2 + \beta_{22} L^2 + \beta_{33} \theta^2 +$$
$$\beta_{12} t_m L + \beta_{13} t_m \theta + \beta_{23} L\theta$$

Table 2 shows a numerical example of the coefficients βs appearing in Equation (8).

TABLE 2

| | |
|---|---|
| $\beta_0$ | 0.0 |
| $\beta_1$ | 0.84 |
| $\beta_2$ | 0.14 |
| $\beta_3$ | 66.84 |
| $\beta_{11}$ | 0.11 |
| $\beta_{22}$ | 7.63 |
| $\beta_{33}$ | 0.45 |
| $\beta_{12}$ | 0.07 |
| $\beta_{13}$ | 0.31 |
| $\beta_{23}$ | 29.5 |

Figure 12A:
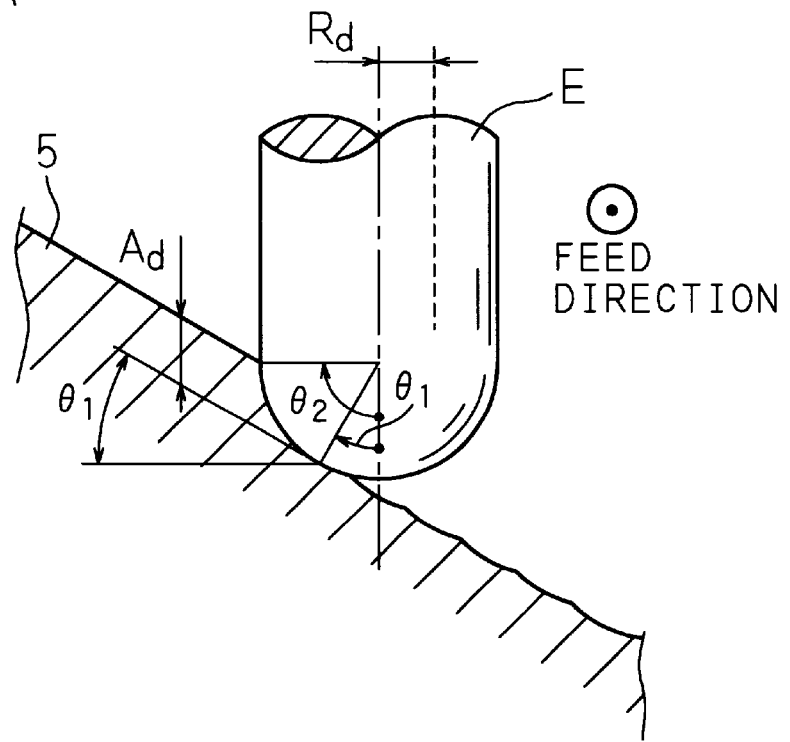
FIG. 12A and FIG. 12B illustrate the situation of conventional cutting and climb cutting, respectively.

As shown in FIG. 12A, in an conventional cutting situation in which the machined surface of the workpiece 5 inclines such that the contacting portion with the end mill E is on the upper side, the active angle θ is such the $\theta_1 \leq \theta \leq \theta_2$ (where $\theta_1$ denotes the inclination angle (helix angle) of the machined surface). In this case, the cutting force $F_{xyz}$ is expressed by the following Equation (9).

$$F_{xyz} = f(t_m, L, \theta_2) - f(t_m, L, \theta_1) \qquad (9)$$

Figure 12B:
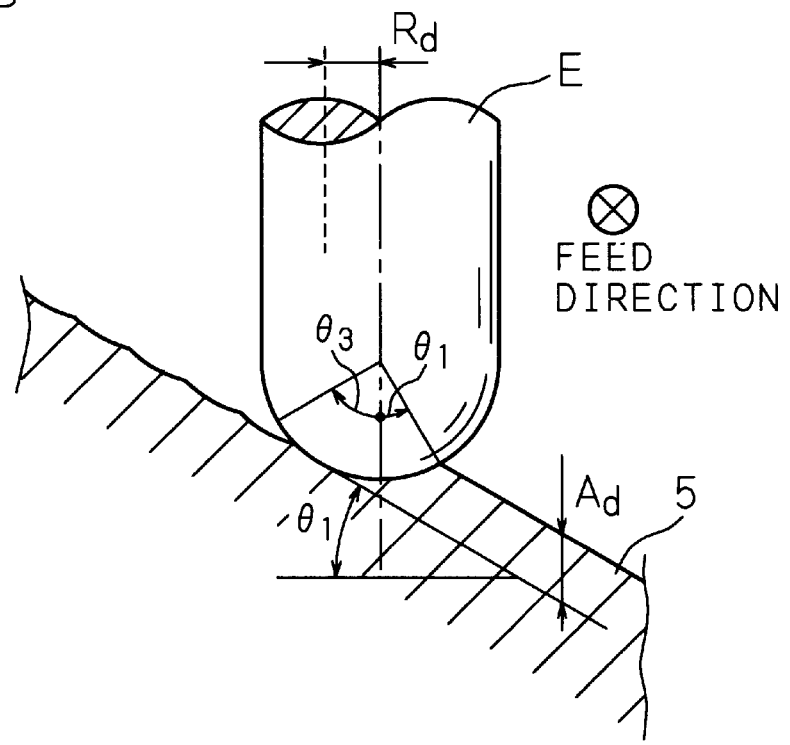

On the contrary, as shown in FIG. 12B, in a climb cutting situation in which the machined surface of the workpiece 5 inclines such that the contacting portion with the end mill E is on the lower side, the active angle θ is such that $-\theta_3 \leq \theta \leq \theta_1$. In this case, the resultant cutting force $F_{xyz}$ is expressed by the following Equation (10).

$$F_{xyz} = f(t_m, L, \theta_1) + f(t_m, L, \theta_3) \qquad (10)$$

In the conventional and climb machining situations shown in FIG. 12A and FIG. 12B, the feed direction of the end mill E is perpendicular to the plane of drawing, as indicated by marks for specifying the direction. The mark in FIG. 12A indicates the direction coming up from the plane of drawing, while the mark in FIG. 12B indicates the direction going deep under the plane of drawing.

The result of a demonstration for confirming the effect of the invention is described below. In the demonstration, a cavity mold shown in the projection drawing of FIG. 13 was machined according to the prior art in which the feed rate is maintained at constant, or alternatively according to the invention in which the cutting force is maintained at constant. The cutting force exerted on the end mill serving as a cutting tool during the machining was measured in each case. Then, the measured cutting forces were compared with each other.

The experimental conditions were as follows.

| Cutting Tool |
| --- |
| Φ10-mm straight end mill (for rough machining) |
| R5-mm ball end mill (for finishing) |
| Both obtained from MMC KOBELCO TOOL Co., Ltd. |

| Cutting Condition | |
| --- | --- |
| Rotation speed of axis (end mill) | 9600 rpm |
| Standard feed rate per tooth $f_z$ | 0.1 mm/tooth |
| Axial depth of cut $A_d$ | 5.0 mm (straight end mill) |
| | 2.0 mm (ball end mill) |
| Radial depth of cut $R_d$ | 0.5 mm |
| Protrusion of end mill | 30 mm |
| Cutting method | Downward cutting |
| Coolant | 0.5-MPa dry air |
| Workpiece material | SKD61 (HRC53) |
| Run-out of end mill | $\leq 5.0\ \mu m$ |
| Collet | Spring collet |
| Machine tool | YBM-850V |
| | (Yasda Precision Tool K.K.) |

Figure 13:
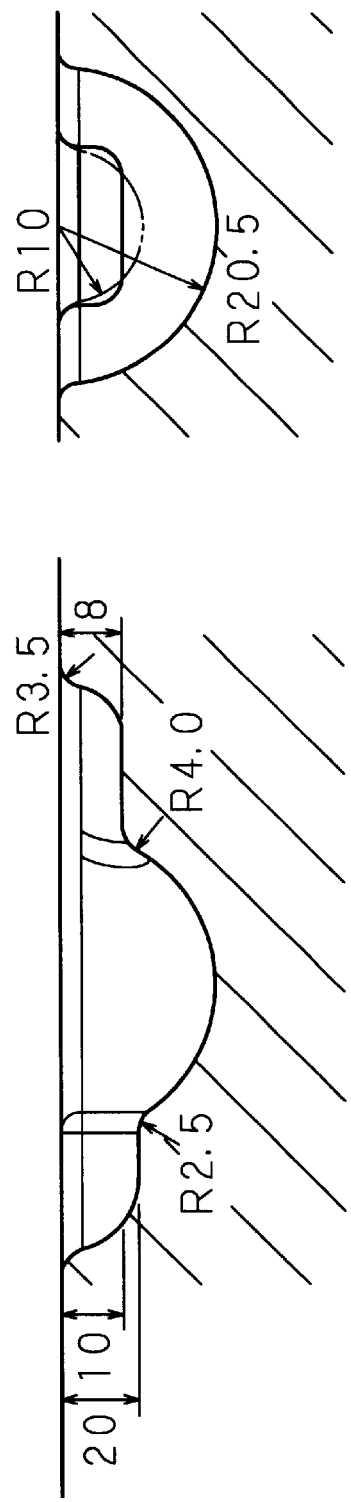
FIG. 13 is a projection drawing showing a cavity mold used as a workpiece in a demonstration of the invention.
Figure 13:
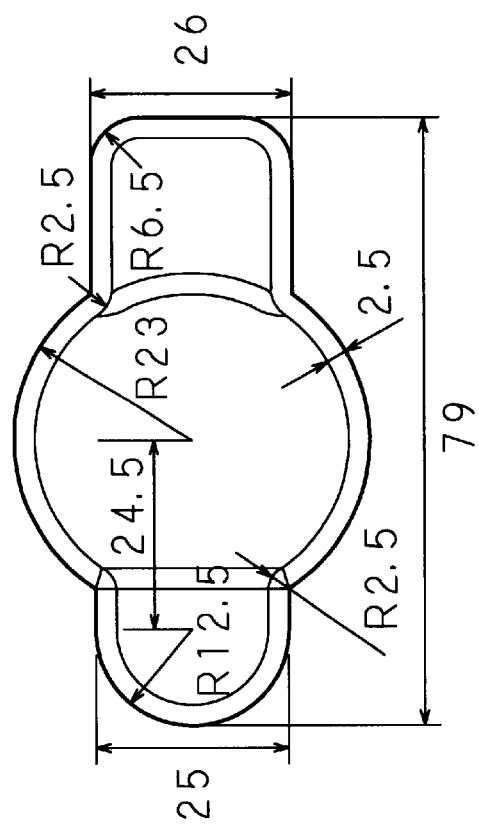
Figure 14:
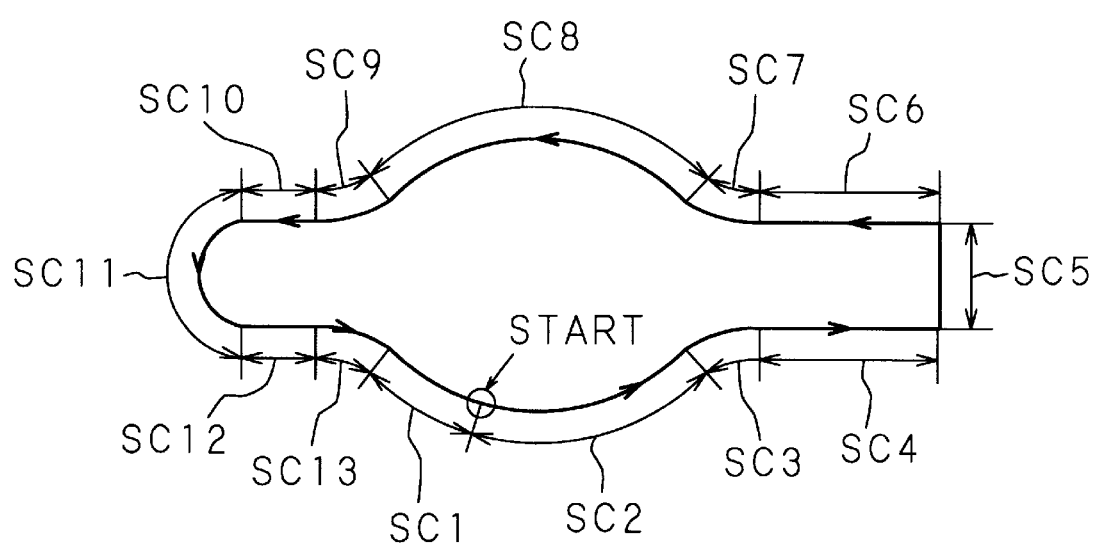
FIG. 14 is a plan view showing a tool path in rough machining of the cavity mold shown in FIG. 13.
Figure 15A:
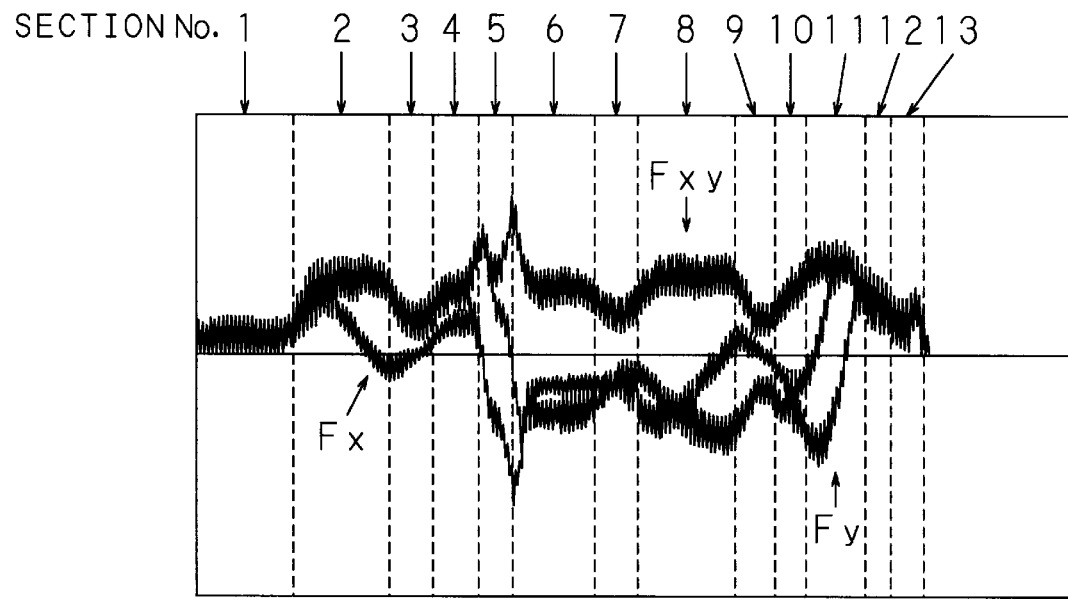
FIG. 15A and FIG. 15B are graphs showing the measurement results of the cutting force in the rough machining along the tool path shown in FIG. 14.
Figure 15B:
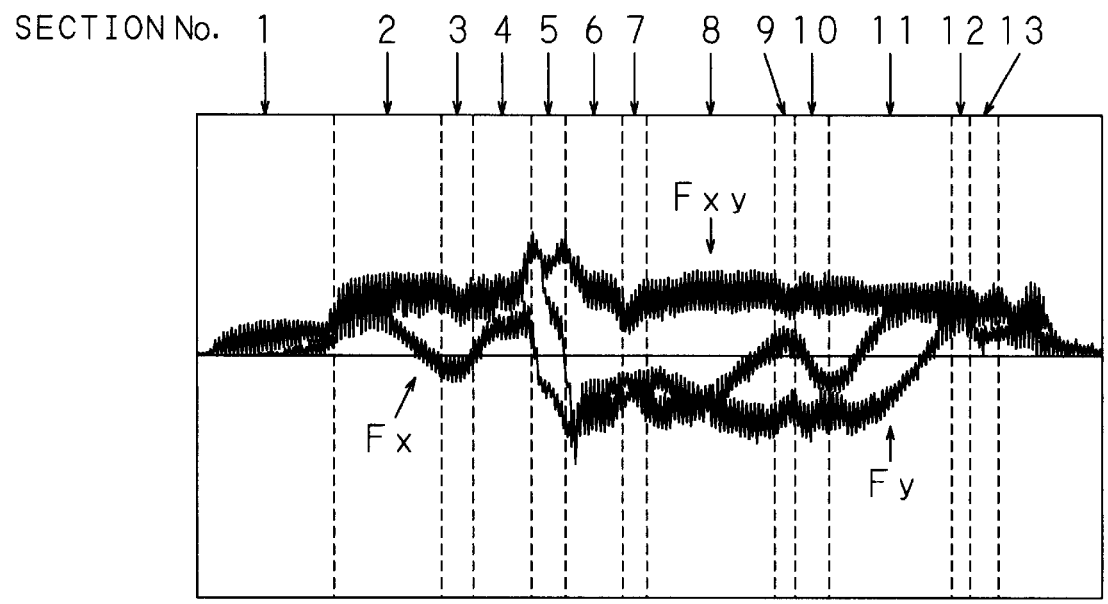

FIG. 14 is a plan view showing a tool path in rough machining of the mold shown in FIG. 13. FIG. 15A and FIG. 15B are graphs showing the measurement results of the cutting force in the rough machining along the tool path. FIG. 15A shows the result of a method according to the prior art in which the feed rate is maintained at constant, while FIG. 15B shows the result of the method according to the invention in which the cutting force is maintained at constant.

The tool path shown in FIG. 14 is divided into straight portions 5a, inner arc (concave) portions 5b, and outer arc portions 5c depending on the pattern. Each portion is designated by a section numeral. A section SC1 is a transition section between the adjacent portions. The machining along the tool path shown in the figure starts at a start point indicated by START, and then goes in the ascending order from a section SC2 to a section SC13. FIG. 15A and FIG. 15B show the measured values of the cutting force $F_{xy}$ (and $F_x$ and $F_y$) indicated with the section numbers of the corresponding sections.

In comparison between FIG. 15A and FIG. 15B, in FIG. 15A according to the prior art, the cutting force $F_{xy}$ varies across the entire sections. In contrast, in FIG. 15B according to the invention, the cutting force $F_{xy}$ is maintained substantially at constant across almost the entire sections, except for a slight variation in the transition areas from the section SC4 to the section SC5 and from the section SC5 to the section SC6. As seen from FIG. 14, the transition areas from the section SC4 to the section SC5 and from the section SC5 to the section SC6 are corner sections where the feeding direction of the end mill is changed substantially at right angles. As a result, a preferable machining situation in which the cutting force is maintained at an appropriate value has been achieved according to the invention, across substantially the entire tool path except for the corner portions.

FIG. 15A and FIG. 15B show the results for a single tool path. However, similar results have been obtained for all tool paths defined for the Φ10-mm straight end mill for rough machining and the R5-mm ball end mill for finishing. As a result, a preferable machining situation in which the cutting force is maintained at constant has been achieved easily and securely according to the invention.

As described above in detail, in the NC program generating method and the NC program generating apparatus according to the invention, the maximum undeformed chip thickness, the cutting arc length or the engage angle, and the active angle for each tooth of the end mill are calculated when the end mill is a ball end mill, or the maximum undeformed chip thickness, the cutting arc length or the engage angle, and the axial depth of cut for each tooth of the end mill are calculated when the end mill is a straight end mill, on the basis of the relation between the tool path of the end mill and the machined surface which have been defined separately. Then, the cutting force is estimated on the basis of a response surface depending on the explanation variables composed of the above-mentioned calculated values, whereby the feed rate is determined such that the estimated value is maintained at an appropriate value. This permits generation of an NC program for achieving a preferable machining situation in which the cutting force exerted on the end mill is maintained at an appropriate level, without the necessity of a large amount of experience and laborious procedures.

Further, when the recording medium according to the invention wherein the computer program of the invention is recorded is mounted on a general-purpose computer, the NC program generating method according to the invention is implemented. This permits easy generation of an NC program for achieving a preferable machining situation. These are the advantages of the invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A method for generating a program used for NC machining in which an end mill having a plurality of teeth arranged along the periphery thereof and rotating around the axis thereof is fed along a tool path defined on a machined surface for machining said machined surface into a predetermined shape, said method comprising the steps of:

calculating, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of said end mill in each portion along said tool path by using the size of an end mill to be used for machining, the cutting depth in the radial direction of said end mill, and the amount of feed per tooth;

obtaining an estimated value of the cutting force in each portion along said tool path by applying the result of said calculation to a response surface whose explanation variables are composed of said maximum undeformed chip thickness, said cutting arc length or said engage angle, and said active angle or said axial depth of cut; and determining the feed rate of said end mill in each portion along said tool path to maintain said estimated value of the cutting force at an appropriate value.

2. An apparatus for generating a program used for NC machining in which an end mill having a plurality of teeth arranged along the periphery thereof and rotating around the axis thereof is fed along a tool path defined on a machined surface for machining said machined surface into a predetermined shape, said apparatus comprising:

calculating means for calculating, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of said end mill in each portion along said tool path by using the size of an end mill to be used for machining, the cutting depth in the radial direction of said end mill, and the amount of feed per tooth;

obtaining means for obtaining an estimated value of the cutting force in each portion along said tool path by applying the result of said calculating means to a response surface whose explanation variables are composed of said maximum undeformed chip thickness, said cutting arc length or said engage angle, and said active angle or said axial depth of cut; and means for determining the feed rate of said end mill in each portion along said tool path to maintain said estimated value of the cutting force obtained by said obtaining means at an appropriate value.

3. A computer memory product readable by a computer to execute a method for generating a program used for NC machining in which an end mill having a plurality of teeth arranged along the periphery thereof and rotating around the axis thereof is fed along a tool path defined on a machined surface for machining said machined surface into a predetermined shape, said computer memory product comprising:

calculating, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of said end mill in each portion along said tool path by using the size of an end mill to be used for machining, the cutting depth in the radial direction of said end mill, and the amount of feed per tooth;

obtaining an estimated value of the cutting force in each portion along said tool path by applying the result of said calculation to a response surface whose explanation variables are composed of said maximum undeformed chip thickness, said cutting arc length or said engage angle, and said active angle or said axial depth of cut; and determining the feed rate of said end mill in each portion along said tool path to maintain said estimated value of the cutting force at an appropriate value.

4. A computer program product for use with NC machine, comprising:

a computer usable storage medium having a computer readable program code embodied therein for generating a program used for NC machining in which an end mill having a plurality of teeth arranged along the periphery thereof and rotating around the axis thereof is fed along a tool path defined on a machined surface for machining said machined surface into a predetermined shape, said computer readable program code comprising:

causing a computer to calculate, in case of a ball end mill, a maximum undeformed chip thickness, a cutting arc length or an engage angle, and an active angle, or, in case of a straight end mill, the maximum undeformed chip thickness, the cutting arc length or the engage angle, and an axial depth of cut for each tooth of said end mill in each portion along said tool path by using the size of an end mill to be used for machining, the cutting depth in the radial direction of said end mill, and the amount of feed per tooth;

causing a computer to obtain an estimated value of the cutting force in each portion along said tool path by applying the result of said calculation to a response surface whose explanation variables are composed of said maximum undeformed chip thickness, said cutting arc length or said engage angle, and said active angle or said axial depth of cut; and causing a computer to determine the feed rate of said end mill in each portion along said tool path to maintain said estimated value of the cutting force at an appropriate value.

* * * * *